INVENTOR.
LEVI S. LONGENECKER
HIS ATTORNEYS

INVENTOR.
LEVI S. LONGENECKER
HIS ATTORNEYS

INVENTOR.
LEVI S. LONGENECKER
HIS ATTORNEYS

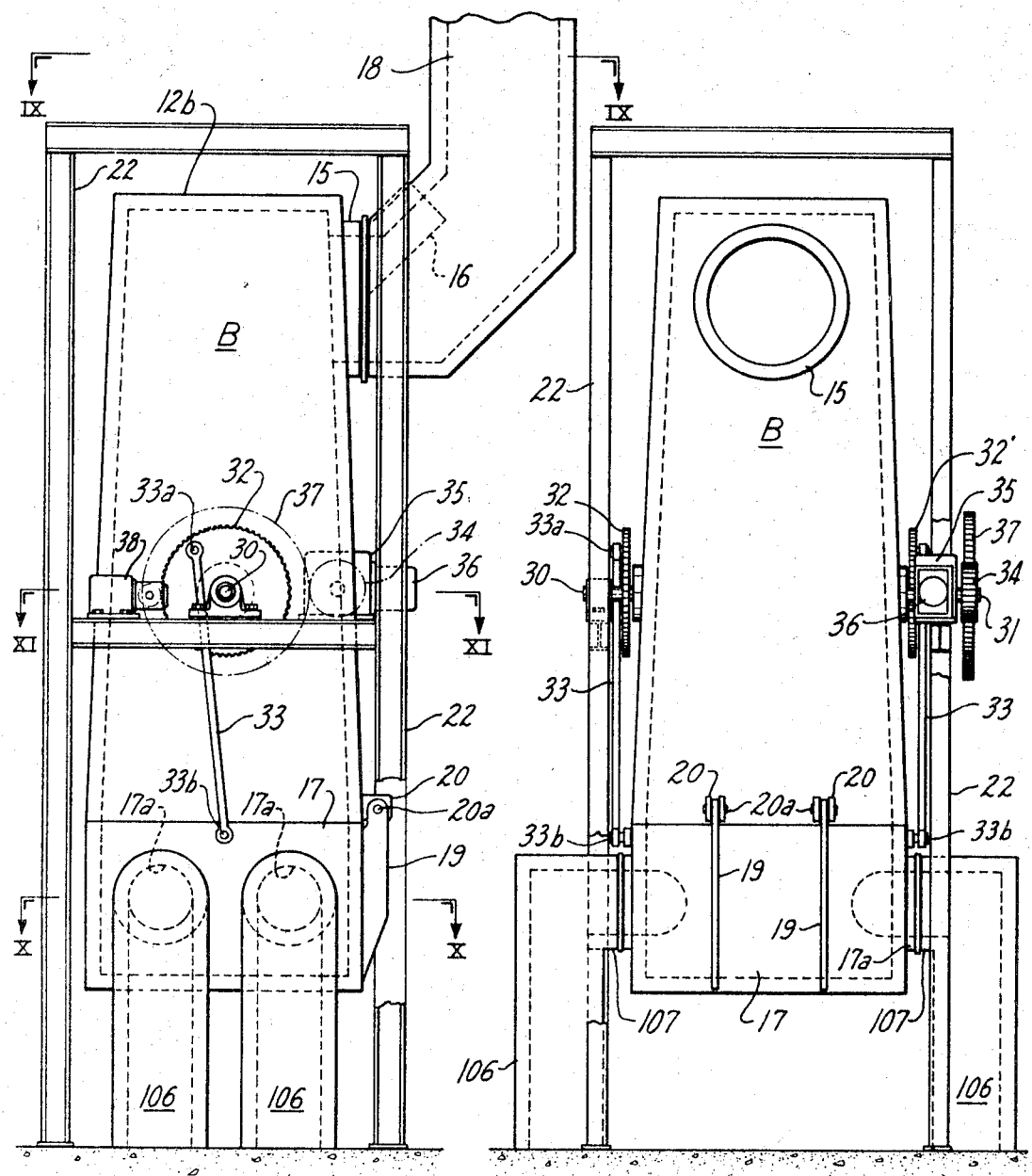

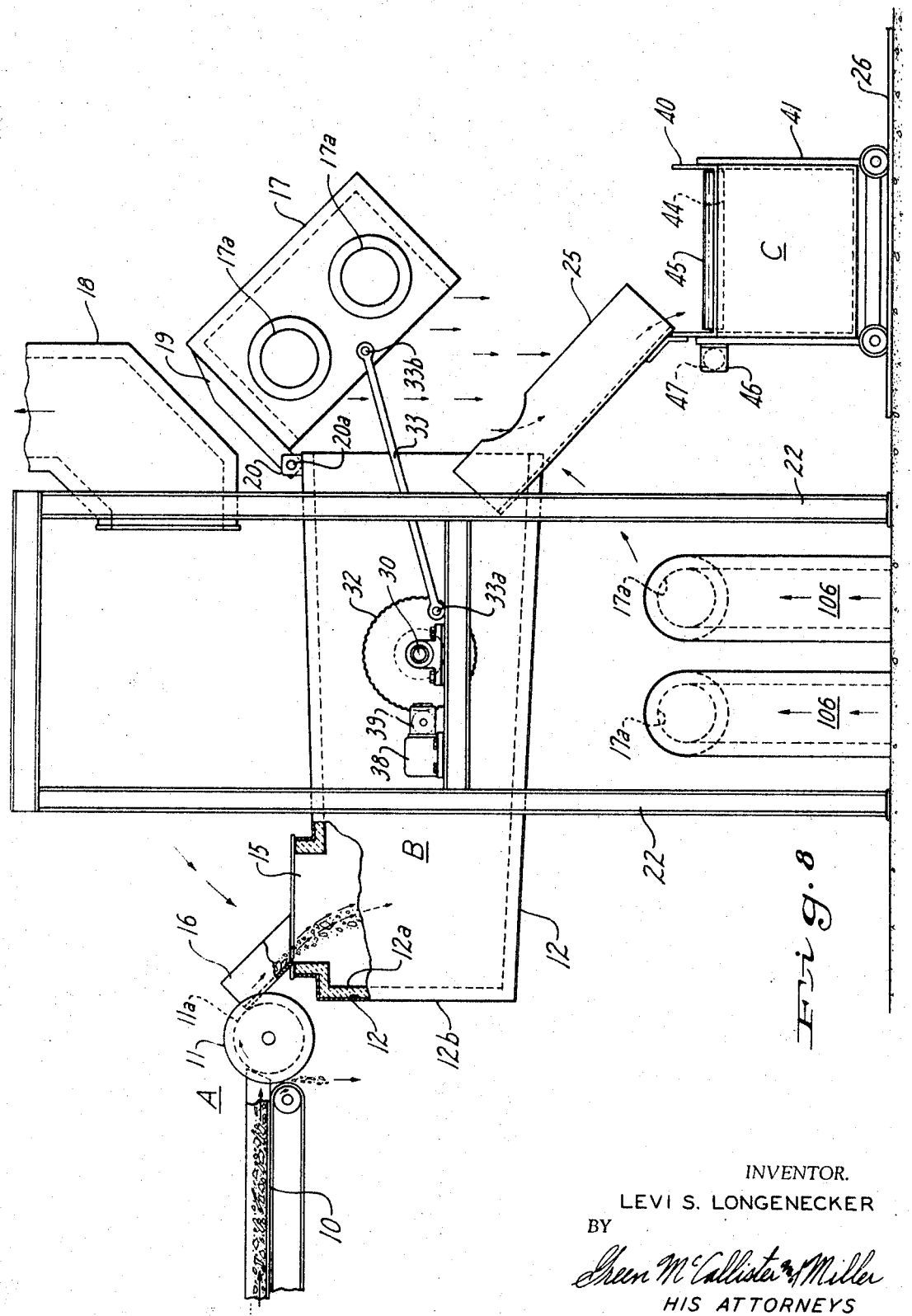

INVENTOR.
LEVI S. LONGENECKER
BY
HIS ATTORNEYS

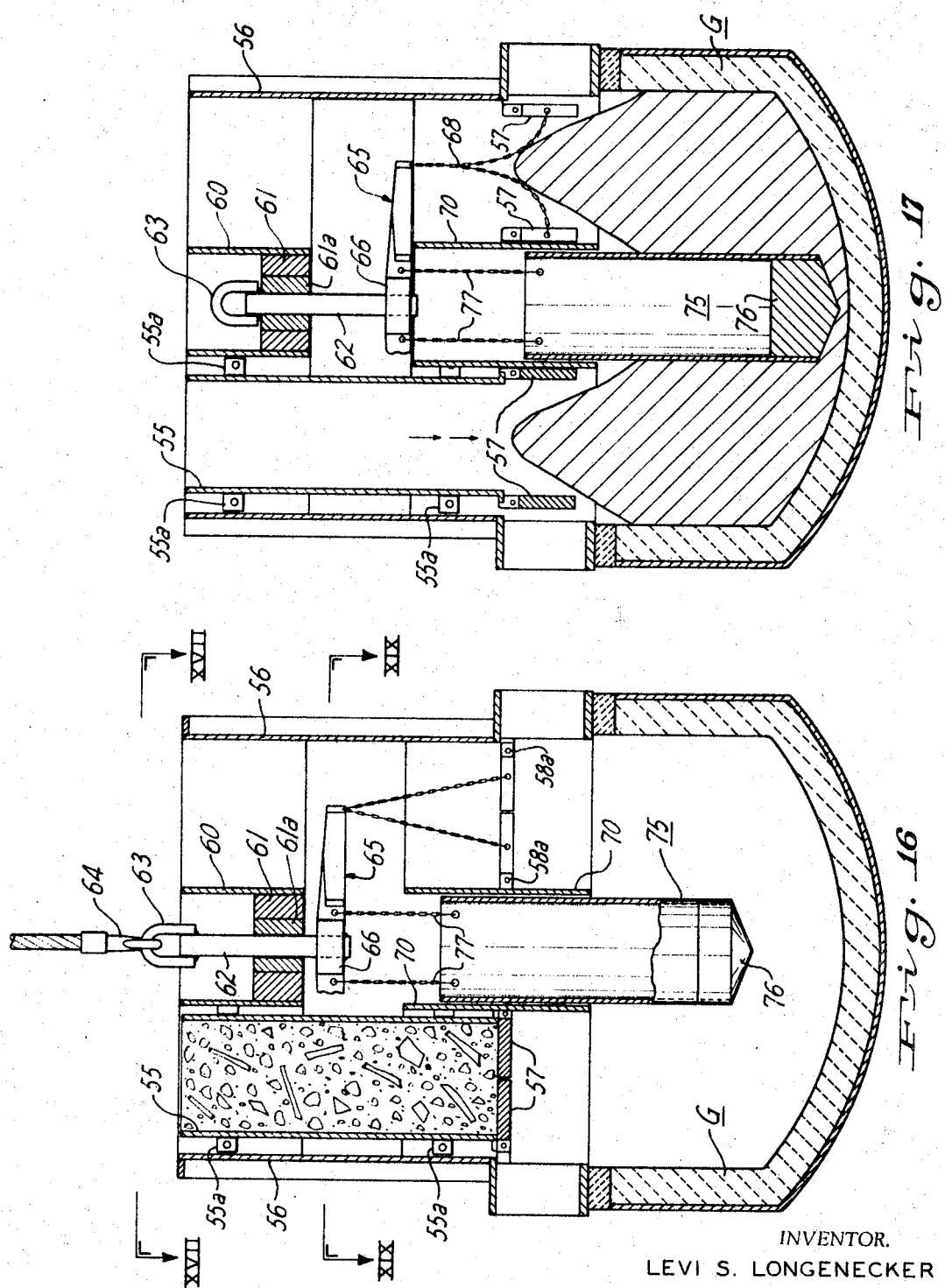

United States Patent Office 3,444,304
Patented May 13, 1969

1

3,444,304
MAKING BASIC OXYGEN STEEL IN AN ELECTRIC
ARC FURNACE SYSTEM
Levi S. Longenecker, 61 Mayfair Drive,
Pittsburgh, Pa. 15228
Filed Aug. 11, 1967, Ser. No. 660,095
Int. Cl. H05b 7/18
U.S. Cl. 13—9                                    20 Claims

ABSTRACT OF THE DISCLOSURE

A method and apparatus are provided for utilizing hot exhaust gases that are continuously taken off from a single metal melting and refining furnace and that are used for preheating the scrap portion of the furnace charge. The furnace has oxygen-blow and electrode-equipped interchangeable roofs that are vented for removing the hot gases and that are interchangeably used for the complete operation. Cold scrap is preheated by an upward flow of hot furnace gases through a silo-like container from which the hotter portions of the scrap are removed for charging into the furnace. Hot scrap charging apparatus is provided having compartments about a central area for introducing the scrap in the form of a doughnut-shaped configuration on the hearth of the furnace and as assured by a centrally-positioned hole maker carried by the scrap box.

---

The invention deals with an improved method of handling charge materials and of conditioning and utilizing them in providing refined or processed molten metal. A phase of the invention deals with a system or apparatus for accomplishing the improved method.

While the invention may be employed in a variety of systems, it is particularly applicable to a ferrous metal or steel refining process employing a conventional circular or an electric type of tiltable furnace, and to the effective employment of a maximum quantity or percentage of relatively low cost scrap metal in the charge.

It is recognized by those skilled in the steelmaking art that while electric arc furnaces are practical for the refining of relatively special metals, such as alloys, the production costs per ton of refined basic metals is significantly greater than that incurred, for example, with a BOF or oxygen blow system. The large amount of electricity used in the electric arc process and particularly in melting a scrap charge, and the time necessarily utilized in charging the furnace has contributed to this relatively high operating cost. Carbon monoxide generated by the oxygen blow also is either lost to the atmosphere or burned outside of the furnace, due to the small interior furnace free area or spacing between its roof and the normal high vertical extent of the scrap charge.

It has thus been an object of the invention to develop an improved procedure and apparatus arrangement that will make practical or economical the utilization of an electric arc furnace for melting and refining of lower grade ferrous metals and alloys.

Another object has been to make more effective utilization of scrap charges in a furnace and in such a manner as to more efficiently and quickly melt and refine it.

A further object of the invention has been to develop

2 apparatus and procedure in accordance with which waste furnace gases are passed through and are employed to preheat a scrap charge, and the preheated scrap may be fully charged in one operation to meet the requirements of the furnace.

Still further objects have been to employ both oxygen blow and electric arc heating steps in an electric furnace utilization, to provide alternative furnace roofs that will facilitate such steps, and to make effective use of heat energy of effluent gases or fume.

These and other objects will appear to those skilled in the art from the illustrated embodiment and the description which follows:

In the drawings,

FIGURE 6 is an enlarged side view in elevation of a refractory-lined scrap preheater and shows pivoting mechanism therefor; this figure is taken from the left-hand side of FIGURE 7;

FIGURE 7 is an end view in elevation on the scale of and showing the apparatus of FIGURE 6;

Figure 9:
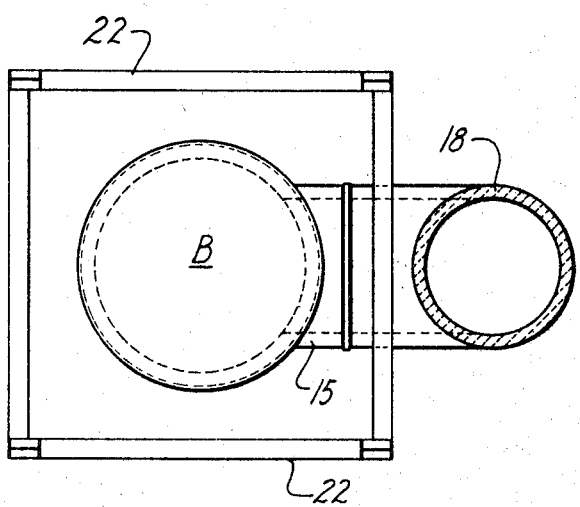
Figure 10:
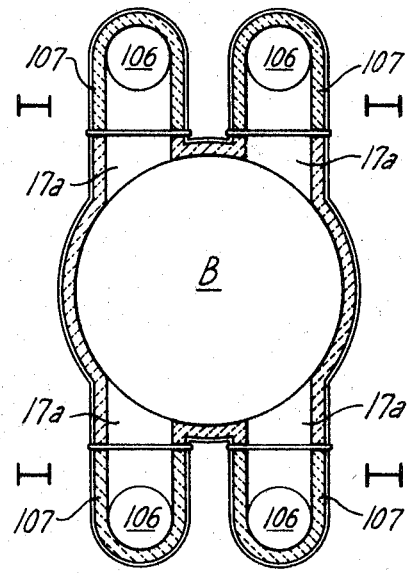
Figure 11:
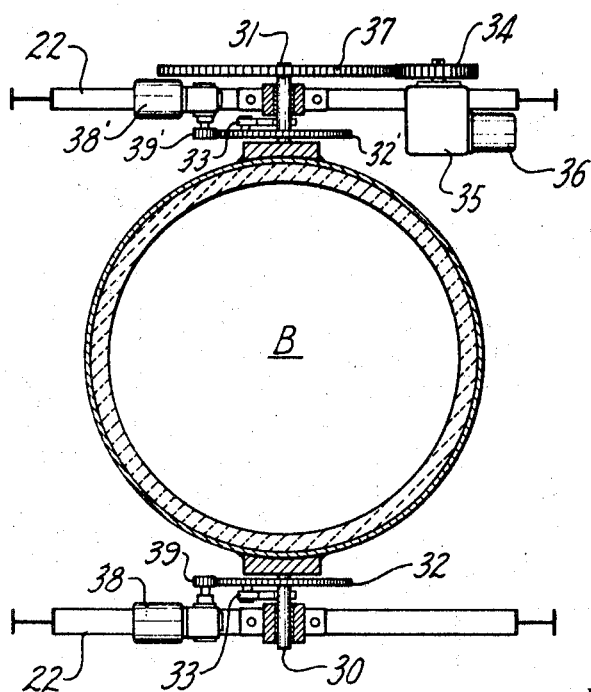
Figure 12:
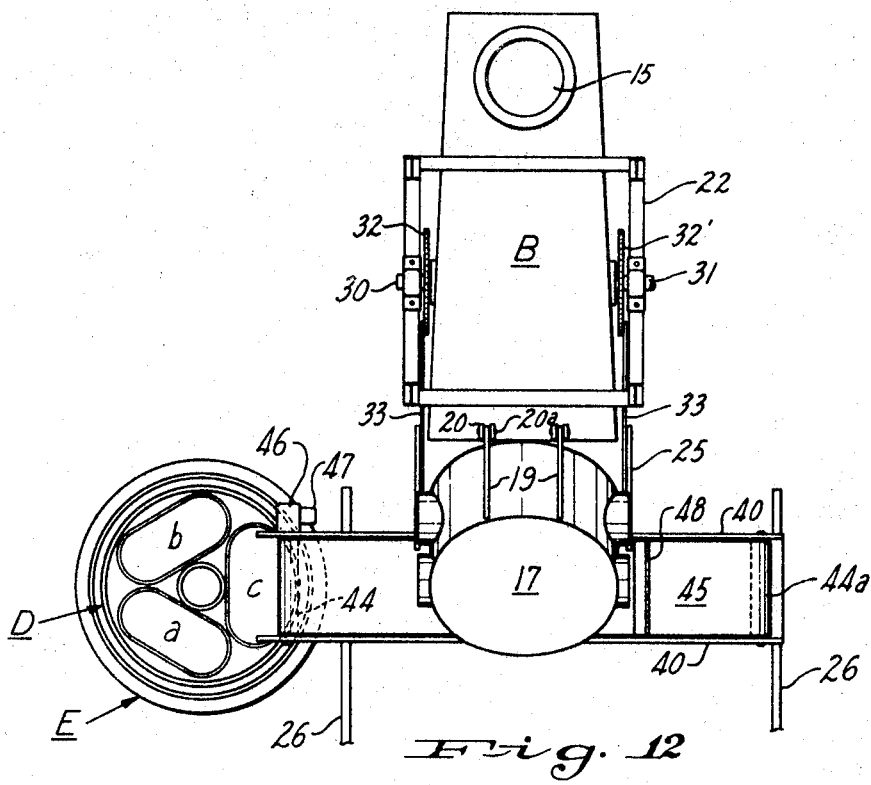
Figure 13:
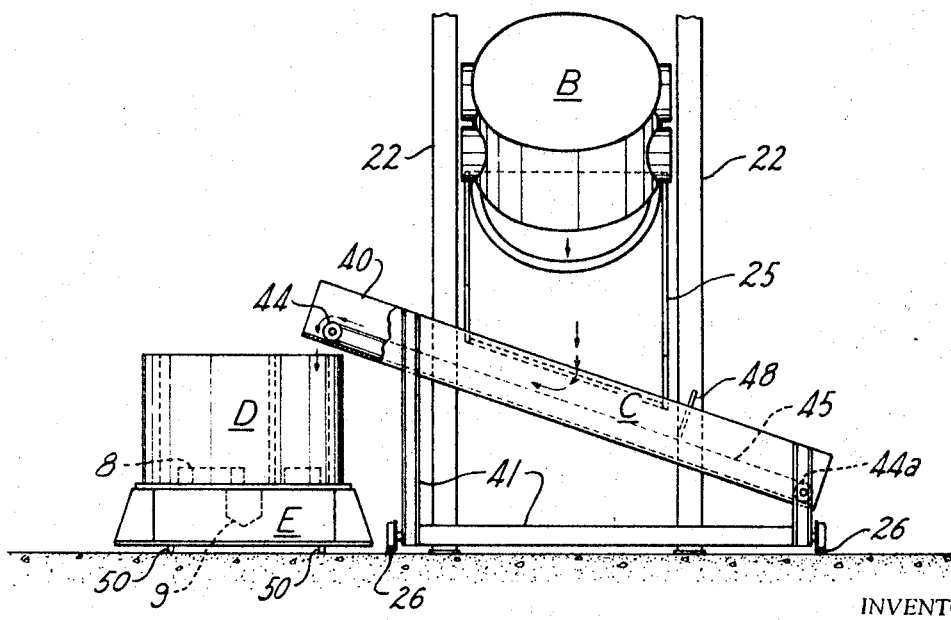
Figure 14:
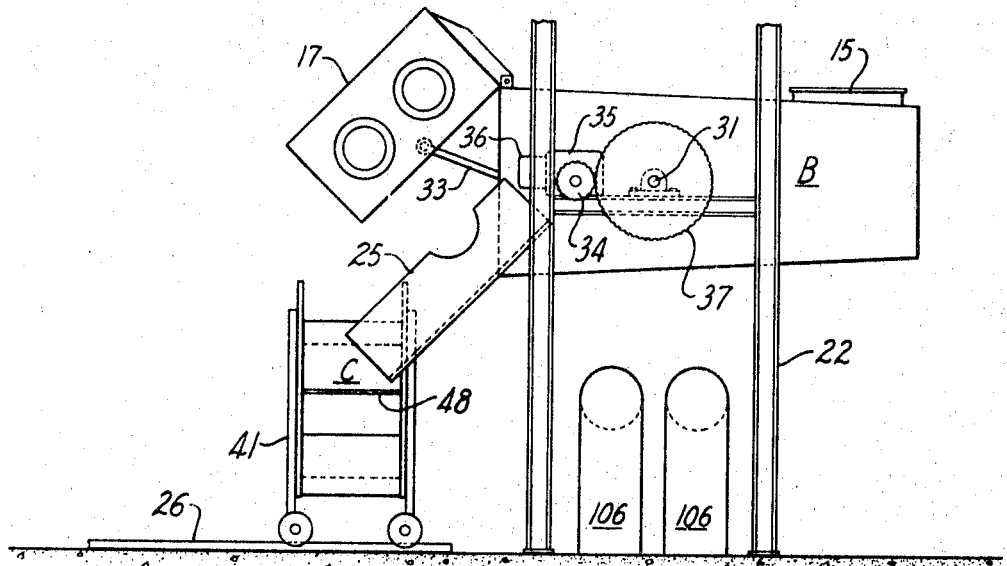
Figure 15:
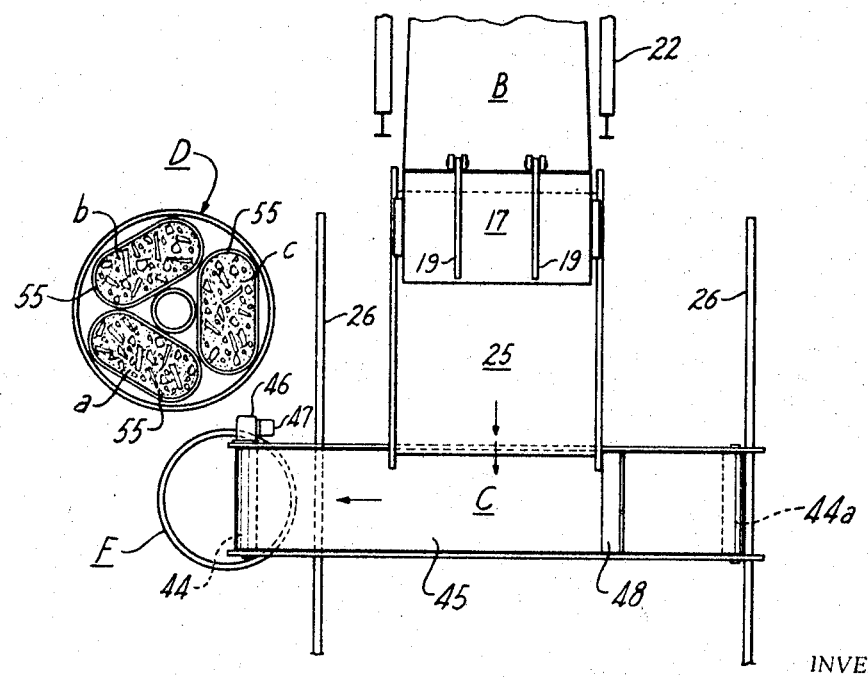
Figure 18:
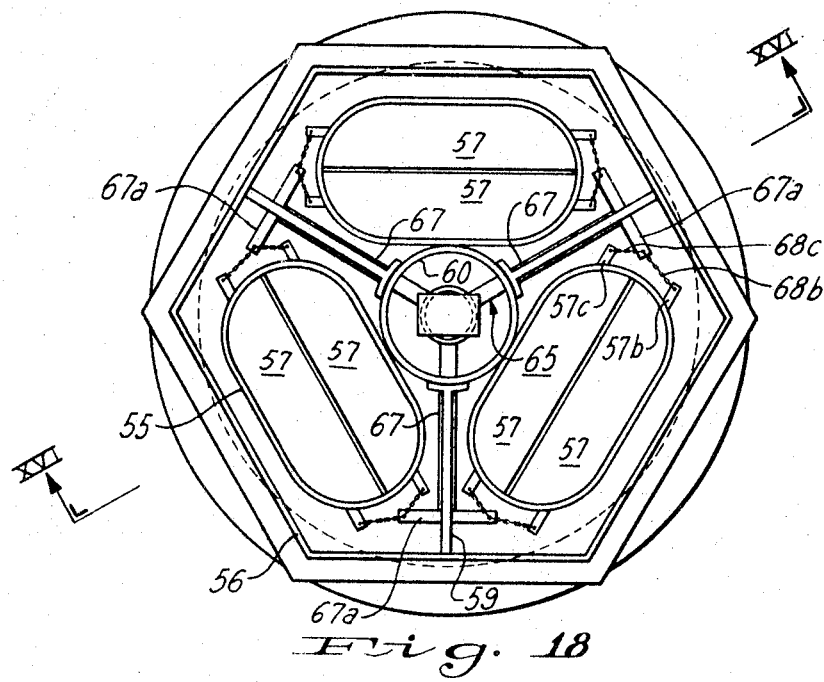
Figure 19:
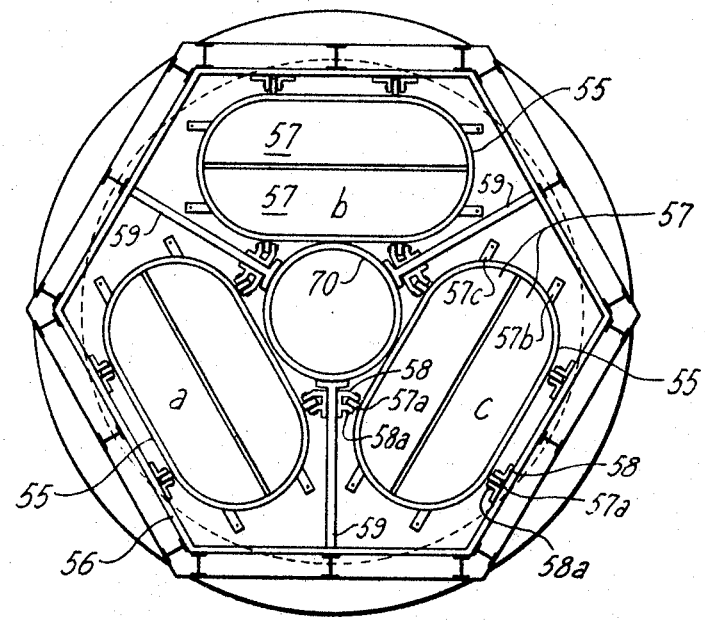
Figure 20:
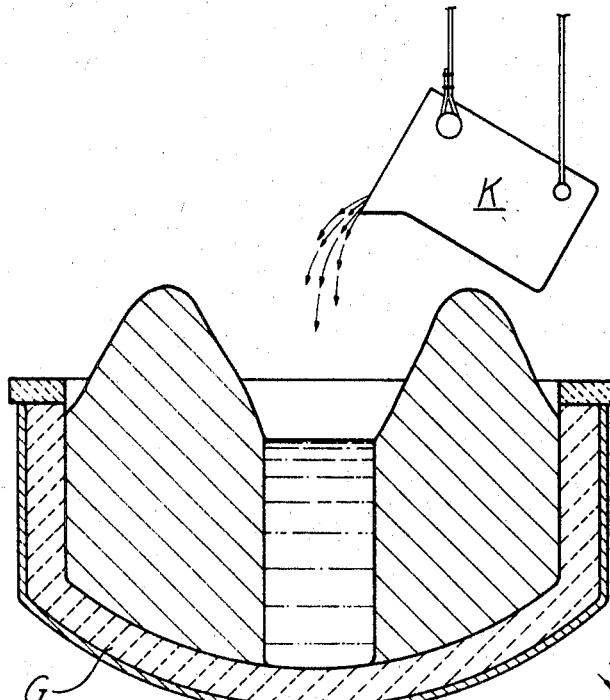
Figure 23:
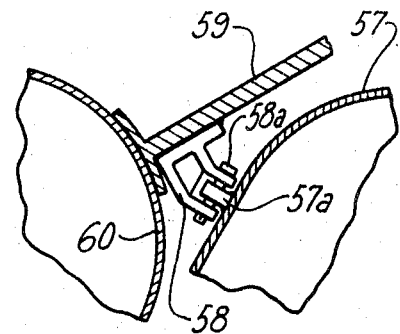
Figure 22:
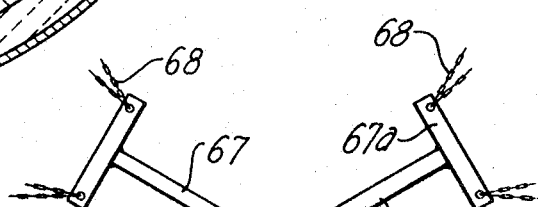
Figure 21:
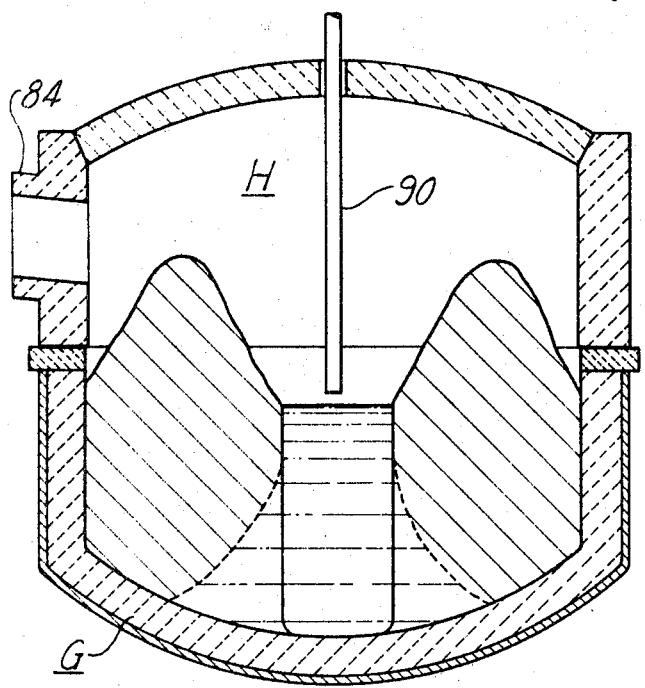

FIGURE 8 is a side view in elevation on the scale of FIGURES 6 and 7 and showing the scrap preheater in a tilted, horizontal, cold scrap-receiving and preheated scrap delivering position; a hinged door on the lower part of the preheater is in an open position to deliver preheated scrap to a chute and a conveyor, and magnetic separating apparatus is in a cooperating position with a feed chute extending from its gas exhaust duct to deliver cold scrap thereto;

FIGURE 9 is a top plan view on the scale of and taken along the line IX—IX of FIGURE 6;

FIGURE 10 is a horizontal section on the scale of and taken along the line X—X of FIGURE 6;

FIGURE 11 is an enlarged horizontal section taken along the line XI—XI of FIGURE 6;

FIGURE 12 is a top plan view on a reduced scale of and showing the scrap preheater in the tilted position of FIGURE 8 to deliver a preheated charge to a chute and a belt conveyor for deposit in a three-compartment scrap bucket assembly;

FIGURE 13 is an end view in elevation on the scale of and of the apparatus of FIGURE 12 and showing the scrap bucket assembly positioned on a rotatable weighing machine;

FIGURE 14 is a side view in elevation on the scale of and of the apparatus of FIGURES 12 and 13;

FIGURE 15 is a top plan view similar to and on the scale of FIGURE 12 showing the scrap charging bucket assembly for handling preheated scrap, fully filled, its bottom door in a closed position, and the conveyor delivering remaining excess preheated scrap to an auxiliary or hold bucket;

FIGURE 16 is an enlarged side section in elevation on line XVI—XVI of FIGURE 18 of the scrap bucket assembly, as constructed in accordance with the invention, as suspended or supported by an overhead crane, gantry or traveling hoist, and as initially positioned in alignment on or over the open mouth portion of a furnace, with a hole maker in a raised position, and with swing bottom doors of individual scrap-receiving and carrying compartments in a closed position;

FIGURE 17 is a side section in elevation on line XVII—XVII of and on the scale of FIGURE 16, but showing the scrap bucket assembly as released from the crane or hoist and resting on the furnace, with its hole maker in a lowered, hole-making position, with swing doors of the individual scrap compartments in an open position, and after the preheated scrap has been charged on the furnace hearth and about the hole-maker to provide a doughnut-shaped configuration;

FIGURE 18 is a top plan view on the scale of and of the scrap bucket assembly of FIGURE 16;

FIGURE 19 is a horizontal section on the scale of and taken along the line XIX—XIX of FIGURE 16; chain pairs have been omitted for clarity;

FIGURE 20 is a fragmental somewhat diagrammatic section illustrating the pouring of molten metal or pig iron into the open central furnace compartment or area provided by the hole maker;

FIGURE 21 is a fragmental somewhat diagrammatic section in elevation showing the oxygen blow roof in position on the furnace, preliminary to starting the melting and refining operation, as accomplished by the use of an oxygen lance; it also illustrates how the scrap metal is progressively melted down into the central molten metal pool when the oxygen blow is initiated;

FIGURE 22 is a top plan view on the scale of and showing details of the construction of a central yoke used with the scrap bucket assembly of FIGURE 18;

And, FIGURE 23 is an enlarged fragmental top plan illustrating a typical hinge connection for each door of a pair of bottom doors provided for an individual scrap compartment of each of a group of scrap buckets of the scrap bucket assembly.

The inventive procedure or system may be employed in melting and refining metal supplied from any suitable source of material. It particularly applies, however, to the utilization of scrap metal and of scrap metal with hot metal or pig iron. If scrap metal which is readily available and inexpensive is to be substantially the sole source of the metal content of the furnace charge, electric furnace operation is indicated. Extra heat may be applied by side burners (not shown) which may supplement the action of the electrodes or may, where desirable, supply all the heat for melting the scrap. If, as preferred, the charge is to be made up of scrap metal and molten metal or pig iron, then an oxygen blow operation is employed, and electrodes may be used for supplementing the melting operation in the sense of finishing or holding the melt to complete its processing and pouring.

In the illustrated embodiment shown in the drawings, cold scrap metal is shown fed over magnetic separator apparatus A (see FIGURE 8) to discard non-magnetic materials and to feed the ferrous magnetic materials along a semi-circular inclined scraper chute 16 that is positioned about and immediately adjacent a gas outlet duct 15 of scrap preheater or silo B. The separator apparatus A may include a continuous belt conveyor 10 and a rotating flanged wheel 11 having an offset magnetic surface 11a. The scrap preheater B is shown as having an outer metal shell or container wall 12 of rounded, longitudinally-extending shape, and an inner, refracting lining 12a, as closed at its upper end 12b, and as having a swing door 17 for closing-off its lower end. The door 17 is of cup-shape and also has a metal outer shell and a refractory lining (see FIGURE 10). The chamber or compartment of the door 17 is adapted to provide a continuation of an inner scrap receiving compartment or chamber of the container 12. The preheater B is shown pivotally or swingably mounted on an upright frame structure 22 and provided at its upper end with a port open to exhaust duct 15 that may be utilized, both for exhausting cooled gases into stack or waste duct 18 and for introducing cold scrap metal into its chamber or compartment when the preheater is swung to a substantially horizontal or horizontally inclined position (see FIGURE 8). During the preheating operation when the preheater B is in a substantially vertical position, the exhaust duct 15 serves to discharge exhaust gases into stack or waste duct 18 that have passed upwardly through interstices of the scrap metal and have cleaned and imparted heat thereto. A conventional induced draft fan (not shown) may be operatively-positioned in the duct 18.

The other or bottom end portion of the preheater B is provided with swingable, cup or bucket-like door 17 which is normally closed during a preheating operation to provide a bottom extension of the preheating chamber of B. The door 17 has a pair of inlet ports 17a (see FIGURES 6, 7 and 10) on each of its opposite sides to receive and introduce hot exhaust gas into the preheater B. As shown in FIGURES 7 and 8, the door 17 has a spaced group or pair of integral arm members 19 that are hinged within bifurcated mounts 20 on the preheater shell B by pins 20a, in order that it may be swung from its closed position of FIGURES 6 and 7 to its open position of FIGURE 8, and to discharge preheated scrap to an inclined chute 25. The chute 25 may be secured to project from a wheeled portable conveyor C (see FIGURES 8, 12 and 13) for delivering the scrap material to a scrap bucket assembly D. The preheater B, at this time, has a substantially horizontal or slightly horizontally inclined position in the direction of the discharge of the preheated scrap material. The preheater B may, for example, have a scrap capacity suitable for about three furnace charges. A bottom portion of the scrap in the preheater B will be used each time for a particular furnace charge, as having attained a desired temperature. If this bottom third of content is greater than needed, any excess may be discharged by the conveyor C (see FIGURE 15) into a hold bucket (not shown).

As shown particularly in FIGURES 6, 7, 8, 11 and 14, the preheater B is of rounded and longitudinally-extending somewhat circular shape with a slight convergence towards its upper end and thus, a slight divergence towards its lower end. It is swingably or rotatably carried in upright frame structure 22 on a pair of cross-extending stud shafts 30 and 31 (see FIGURE 11). The stud shafts 30 and 31 are journaled within mounts carried by the frame structure 22 (see also FIGURES 6 and 7). A pair of drive gears 32 and 32' are rotatably-secured on the shafts 30 and 31 and each has a door bar or operating arm 33 pivotally-mounted thereon in an off-axial relation with respect thereto adjacent its outer periphery by a pivot pin 33a. Each door bar or operating arm 33 is, at its other end, pivotally-secured by a pin 33b centrally to an upper portion of one side of the swing door 17 for actuating it in its opening and closing movements about the pivot pins 20a. Since the gears 32 and 32' and their associated arms 33 are positioned on opposite sides of the preheater B, a balanced operating support is provided for the door 19. The stud shaft 31 has a driven gear wheel 37 securely-mounted or keyed on its outwardly-extending end and meshing with a driving pinion 34 of a gear reduction unit 35 (see FIGURES 6, 7 and 11). The unit 35 is driven by an actuator such as electric motor 36 to swing the preheater silo B or container between its vertical and substantially horizontal positions. It will be noted that the door 17 is swung to an open, charge delivering position when the preheater B is in a horizontal position. The gears 32 and 32' are in the form of driven gear wheels, in that they have gear teeth along their outer peripheries and are actuated by reversible, synchronized electric motors 38 and 38' that are mounted on opposite sides of the frame structure 22 and that operate through pinions 39 and 39' and gears 32 and 32' which rotate about stud shafts 30 and 31, to actuate the arms 33. Thus, the door 17 may be swung between open and closed positions by the motors 38 and 38'.

As will be noted from FIGURES 6 and 8, the flange of the exhaust port duct 15 of the preheater B when in its vertical position is adapted to provide a closing-off fit with a corresponding flange of the stack or waste duct 18, and chute 16 has an outside positioning with respect to the stack 18. Thus, cooled gases leaving or exhausting from the preheater B may freely flow into the stack.

As shown particularly in FIGURES 12, 13, 14 and 15, the portable or wheeled conveyor C has a U or channel-shaped, inclined, longitudinally-extending box or channel-shaped guide part 40 carried on a frame structure 41. A pair of upper and lower rollers 44 and 44a are rotatably-positioned within the guide part 40 to support a continuous belt 45. As shown particularly in FIGURES 8 and 12, the upper roller 44 has an extending drive shaft that is actuated by a reduction gear unit 46 and an electric motor 47 that are secured on a side of the part 40. The motor actuated rotation of driven roller 44 causes the continuous belt 45 to deliver scrap material received thereon from the preheater B and the chute 25, upwardly and into a scrap bucket assembly, such as D. A baffle 48 is shown in FIGURES 12 to 15 as secured to extend across the guide part 40 above the continuous belt 45 to keep the scrap material from falling below the point of delivery to the belt.

The bucket assembly D is placed on a weighing table E (see FIGURE 13) that has circularly-disposed and spaced-apart wheels 50 in its base, in order that it may be rotated on the plant floor to selectively-align each compartment of the scrap bucket assembly D with the discharge end of the wheeled conveyor C. That is, when one compartment of the assembly D is filled with scrap, the table E will be slightly rotated to align a second or empty compartment until all the compartments are filled.

Of course, scrap metal material introduced into the bucket assembly will be weighed by the Table E to provide a requisite size of charge for a given furnace. The conveyor C shown is of a self-contained type on a carriage which is movable along a trackway 26 in the plant.

The scrap bucket assembly D (see FIGURES 15 to 19) has a group of scrap receiving compartments a, b, and c therein, each provided by separate scrap buckets or inner container walls 55. The buckets 55 are disposed in a peripherally-spaced relation within the assembly and in such a manner as to define a hollow central portion. Each scrap bucket or inner container 55 of the assembly is shown as having a vertically-extending and open-end metal wall of elongated and rounded-end cross-section, and as secured by side tabs 55a within an open-end, vertically-extending, metal outer container wall 56, shown of hexagonal cross-section and reinforced construction. The wall 56 may, if desired, be circular in cross-section. Each bucket 55 has a pair of cooperating, down-flap or swing doors 57 for closing-off its bottom when scrap is being introduced to its compartment and is being carried to a furnace charging position. FIGURE 16 shows door pairs in a closed position and FIGURE 17 shows them in an open position after scrap has been charged into a furnace. Each door 57 (see FIGURE 19) has a pair of spaced-apart side-positioned hinge lugs 57a, each of which is pivotally-positioned in a bifuracted mount 58 by a hinge pin 58a. One pair of mounts 58 is secured to project inwardly from the outer container 56 and a second pair of the mounts 58 is secured to project outwardly from an adjacent diagonal bracing arm structure or spider-like bottom yoke assembly 59 of three arms.

An upper, centrally-disposed, short length sleeve or hollow tubular part 60 is secured, as by welding and tabs in position to and between the walls of the buckets 55 to receive a closure and position-limit disc part or block 61 therein (see FIGURES 16 and 17) that is weld-secured thereto. The block 61 has a bearing insert 61a to slidably-receive a vertical supporting, operating and lifting rod or pin 62. The rod 62 has an enlarged eyelet 63 at its upper end to removably-receive a crane or hoist hook 64 for raising and maintaining an upper central lift yoke 65, of spoke or spider-like construction, in a top position shown in FIGURE 16. It will be noted that the lower end of the operating rod 62 is secured within a hub 66 of the yoke 65. When lifting force is released by the crane hook 64, the weight of the parts will cause the rod 62 to fall to a lower position of FIGURE 17, as limited by the engagement of its enlarged upper eyelet end 63 with the upper face of the block 61. At the same time, the yoke 65 will fall to its lower position of the same figure.

The yoke 65 (see FIGURES 18 and 22) is shown provided with three diagonal arms 67 that at their ends carry a cross member 67a to provide a T-shaped end portion. Lift chain pairs 68 are secured adjacent each of the cross members 67a. One chain 68b (see FIGURES 18 and 19) is secured to one end-projecting lift lug 57b at one end of one door 57 of one bucket 55 and the other chain 68c is secured to an adjacent end lift lug 57c of the other door 57 of the same bucket 55. It will be noted that the lift lugs 57b and 57c at the opposite ends of each pair of doors 57 are similarly connected by chain pairs to another or adjacent arm 67a. The doors 57 are moved to and retained in a closed or horizontal position by engagement with blocks 8 when the bucket assembly rests on a platform, such as provided by the weighing machine E. At the same time, a lower end of a hole maker body 75 enters a recessed portion 9 in the platform of the machine E to move the body to an upper position illustrated in FIGURE 16. When upward pulling force is exerted by the chain pairs 68 through the agency of the lift yoke 65 and the hook 64 of the overhead crane after the bucket assembly D has been filled with scrap, see FIGURE 16, the same result is obtained. On the other hand, when upward force is released (see FIGURE 17), the chain pairs 68 permits the doors 57 to swing to downwardly-open positions to discharge scrap from their associated scrap buckets 55.

Hole maker or body 75 is shown of tubular or sleeve-like construction and as having a solid, heavy weight tapered end part 76 that closes-off its lower end to provide a body shape that has a gravity down stroke into a furnace G when the hole maker 75 is released from an upper pull exerted by a pair of chains 77 that suspend it centrally from the yoke 65 (see FIGURE 17). When the yoke 65 is in its upper position of FIGURE 16, the chains 77 keep the hole maker 75 in an upper or retracted position with respect to the fixed guide sleeve 70.

In view of the above, the scrap bucket assembly D containing charges of scrap material within the compartments a, b and c of its scrap buckets 55 may thus be lifted off the weighing table of the machine E by means of the hoist hook 64 of a gantry or overhead traveling crane. The upward movement of the hook 64 and thus of the lift yoke 65, will cause the chain pairs 68 which are connected to the swing doors 57 of each scrap bucket 55 to reach a vertically-tensioned condition, such that the doors are held tightly closed and the scrap bucket assembly D may be lifted and moved to a furnace charging position. At the furnace charging position, the hoist hook 64 may be then lowered to lower the yoke 65 and thus release the tension on the chains 68, at which time, the plunger 75 moves within its sleeve 70 to a downwardly-projecting position and the weight of the scrap in the compartments and the weight of the doors 57, themselves, will cause the pair of swing doors 57 of each compartment to swing downwardly to an open position and discharge scrap into and upon the floor of the furnace and about the hole maker 75. The hole maker is suspended somewhat like a pendulum and the scrap falls in a substantially balanced relation about it to center it within the furnace. After the scrap has been fully discharged from the scrap bucket assembly D, the yoke 65 may then be raised by the hook 64 to again close the swing doors 57, to raise the hole maker 75 to its upper position of FIGURE 16, and to then raise the assembly out of the furnace and back to the weighing table E for refilling.

The scrap bucket assembly D of the invention is unique not only from the standpoint of the scrap buckets 55, themselves, but also from the standpoint that it has the centrally-positioned hole maker 75 that is carried in the central opening or spacing between the individual buckets of the assembly. As shown, the hole maker 75 is in the form of a telescopic cylinder, body or form member which is adapted to slide vertically within a hollow compartment formed by fixed sleeve member 70. When the yoke 65 is in its downward or chain releasing position, the plunger is in a slightly spaced relation from the hearth of the furnace to thus protect it from damage. The scrap discharged through the open bottom ends of the buckets 55 flows into melting and refining furnace G and forms upright piles therein that may extend into the additional overhead space provided by hood-like roof H (see FIGURE 21). This provides the furnace G with additional solid scrap capacity such that when the scrap is melted down it will more completely fill the capacity of the furnace as molten metal below the parting line with the roof H.

Figure 1:
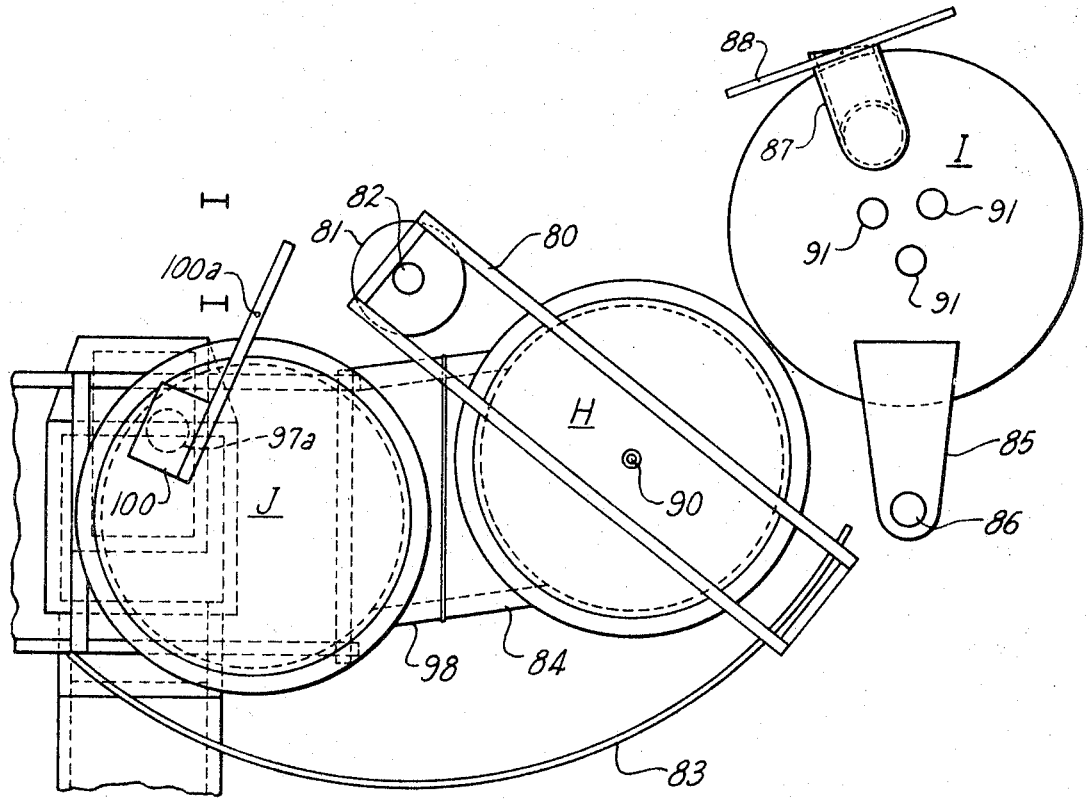
FIGURE 1 is a top plan view showing a large volume oxygen blowing roof or hood in an operating position on an electric furnace and a conventional electrode-carrying roof positioned to the right thereof for alternative use.
Figure 2:
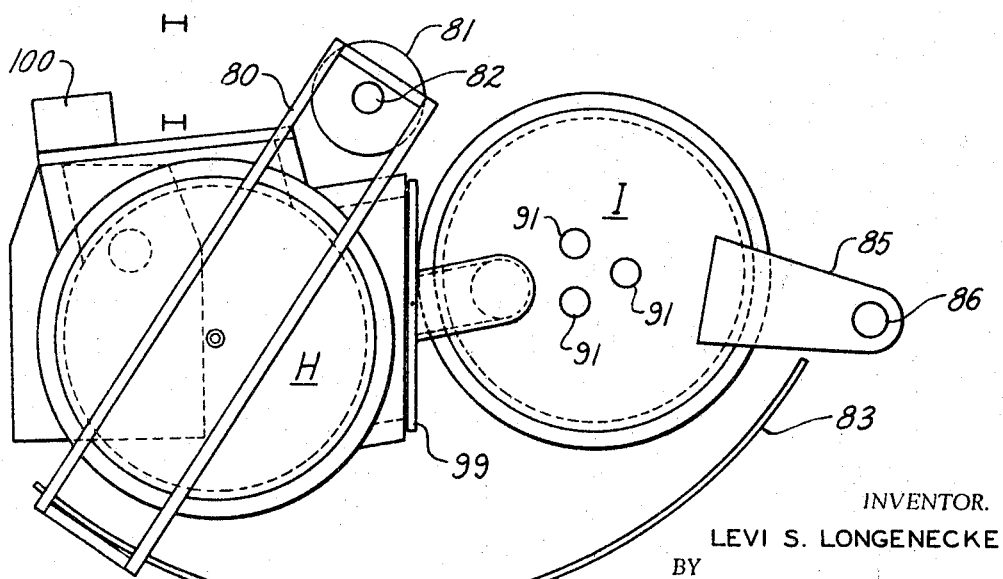
FIGURE 2 is a top plan view of and on the scale of the apparatus of FIGURE 1, and illustrates the oxygen blowing roof in a left-hand stored position over a fume collecting tower, and the conventional electrode-carrying roof positioned in an operating position over the furnace.
Figure 3:
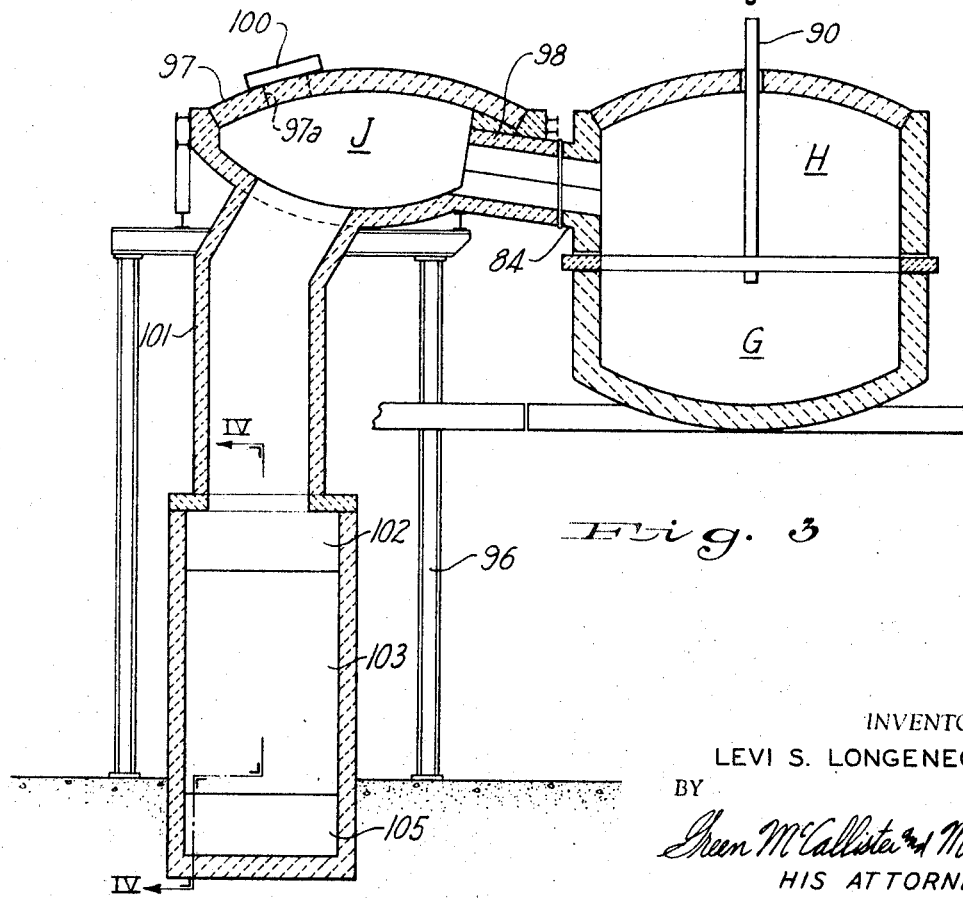
FIGURE 3 is a side section in elevation on the scale of and of the apparatus as shown in FIGURE 1, with the oxygen blowing roof positioned on the furnace.

Referring particularly to FIGURES 1 to 5, inclusive, 20 and 21, a furnace layout is illustrated comprising melting and refining furnace G having an open mouth and a conventional hearth, an oxygen blow roof H of hood-like construction to define an enlarged continuation of the furnace compartment area when it is in a cooperating position with respect thereto as shown in FIGURE 3, a substantially conventional, flat top, low volume furnace roof I (shown as a conventional electrode carrying roof), and an exhaust gas collecting tower J. Referring particularly to FIGURES 1 and 2, the oxygen blow roof H is shown mounted on a frame 80 that is swingably or rotatably-pivoted by an end plate 81 on an upright post 82 for movement along a track 83 between a left-hand inoperative position or side of the furnace (see FIGURES 2 and 5) on top of the collecting tower J and to an operating position over the furnace G (see FIGURES 1 and 3). The furnace G may be of conventional construction having a pour opening, a door and being capable of being tilted for pouring the melt. The electric furnace arc electrode carrying roof I has an arm 85 extending therefrom and pivotally mounted on an upright post 86 for swinging movement between a right-hand inoperative position or side of the furnace of FIGURE 1 to a left-hand operating position over the furnace (see FIGURE 5).

The oxygen blow hood roof H, as shown in FIGURE 3, is provided with a gas exhaust or outlet duct or snorkel 84 that is flanged to fit with an inlet duct 98 of the collecting tower J. As shown in FIGURE 1, the outlet snorkel 84 is of rectangular shape corresponding to the rectangular shape of gas inlet duct or snorkel 98 of the collecting tower J. The electrode carrying roof I is provided with an exhaust port having a circular duct or snorkel 87 extending through its top and provided with an adaptor-reducer for providing a cooperating fit with the inlet duct 98 of the collecting tower J (see FIGURES 1 and 5). The roof H may carry one or a group of conventional oxygen blow lances 90 to adjustably extend downwardly therethrough in alignment with the central portion of the furnace G which contains molten pig iron or molten ferrous metal (see FIGURE 21). Also, as shown, the furnace roof I may be provided with a group of conventional electrically-energized arc melting electrodes 91 extending downwardly therethrough to project within the furnace G. These electrodes are conventionally provided with a raising and lowering mechanism, so that they will clear the walls of the furnace G when the roof I is being swung into and out of position over the furnace.

The collecting tower J (see FIGURE 3) is supported on an upright frame structure 96 and has an upper receiving chamber defined about a refractory enclosure 97 and has the gas inlet duct or snorkel 98 adapted to cooperate with outlet duct or snorkel 84 of the hood roof H and with outlet snorkel 87 of the relatively flat roof I. The enclosure 97 which defines a gas collecting chamber to one side of the furnace G, as shown, has a top port 97a that is closed by a swing damper cover 100, in order that, as necessary, tempering ambient cool air may be introduced and mixed with the hot exhaust gases or fluid being introduced from the furnace G. As shown in FIGURE 1, the damper 100 is pivoted at 100a for movement over the port 97a. When the hood roof H is swung to a position over the tower J (see FIGURES 2 and 5), it is turned or rotated on the track 83, and pushes the cover 100 to one side about its pivot 100a. The port 97a is thus now open to the chamber of the roof hood H.

Figure 4:
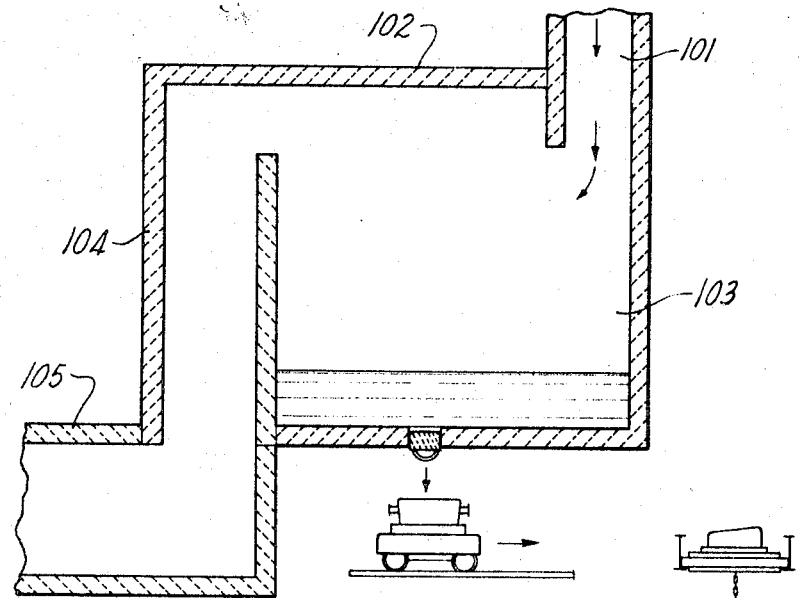
FIGURE 4 is a transverse or end section in elevation on the scale of and taken along the line IV—IV of FIGURE 3.
Figure 5:
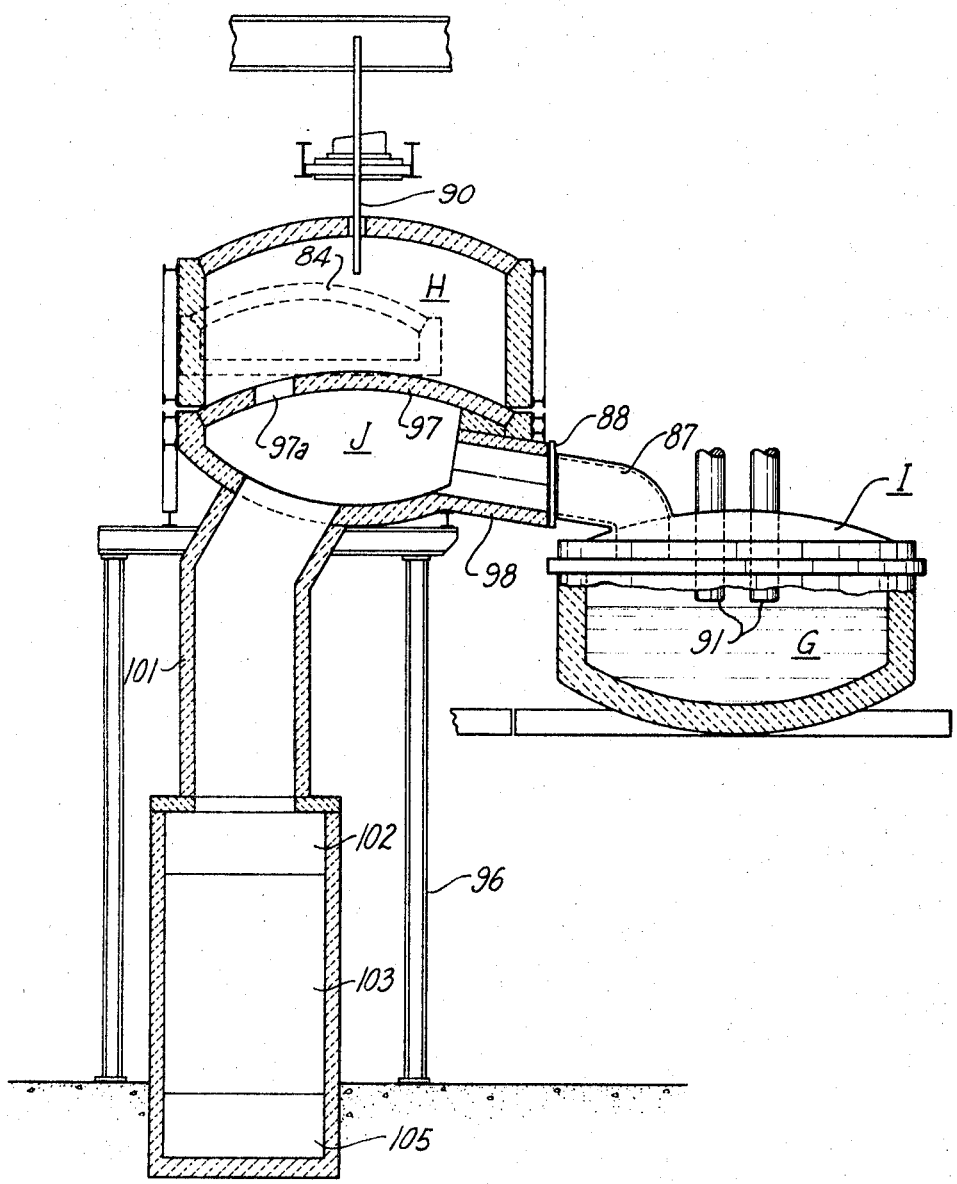
FIGURE 5 is a side section in elevation on the scale of and showing the apparatus of FIGURE 2 in the position of such figure.

As shown particularly in FIGURES 3 to 5, the enclosure 97 is open through its bottom portion to a refractory down-flow duct 101 that, at its lower end, introduces hot exhaust gases into a checker work chamber 102 having a slag collecting pocket 103 and a down-flow duct or passage 104. Gases entering the passage 104 (see FIGURE 4) are flowed through a bottom duct or tunnel 105 into a top-flow, branch group of ducts 106 from under the plant floor that are arranged in opposed pairs, as shown particularly in FIGURES 6 and 7. Each top flow duct 106 has a horizontal outlet portion 107 whose flange is adapted to be slidably-engaged with a cooperating flange of a corresponding, aligned, entry port 17a of the swing bottom door 17 of the preheater B. Thus, hot gases as suitably tempered in the collecting column J and whose slag has been removed in the slag pocket 103 of checker work chamber 102, will flow upwardly through the interstices of metal scrap contained in the hollow container of the preheater B, losing its heat to the scrap, and then will pass outwardly through the exhaust port 15 into the stack 18. This flow may be enhanced by employing a conventional induced draft fan (not shown) in the stack 18.

The scrap metal tends to collect valuable metal oxides, etc. from the gas moving through its interstices. On the other hand, the hot gas during its movement will tend to volatilize or melt lower melting point metal, such as a non-ferrous metal, in the nature of lead, zinc, copper contaminants carried by the scrap, to either carry them off through the stack or, if they are merely melted, to remove them from the solid scrap metal and collect them at the bottom of the preheater from which they may be bled-off. It will be appreciated that the movement of the gases through the scrap will not only impart a preheat to it, but also cools the gases and imparts a cleaning action on the scrap. The cooling of the gas lessens the load on any conventional fume cleaning apparatus to which the stack 18 is connected.

It has been found desirable to temper the hot exhaust gases so as to impart a preheat in the neighborhood of 1700° F. to the scrap in the preheater B and to a temperature at which the scrap will not become sticky. The gases may thus be introduced to the bottom of preheater B at about 2000° to 2200° F. The temperature of gases, of course, will drop off toward the top of the preheater B, normally to 300° to 400° F. at the exhaust port 15. These gases thus impart what would normally be waste heat to the scrap material before it is charged into the furnace to minimize the heat that has to be imparted to it in melting it down within the furnace. It has been determined that the charging of the scrap into a furnace by the scrap charging assembly scrap bucket assembly D can be effected within a period of not exceeding three minutes and that if a second crane or hoist is available, the hot molten metal (see FIGURE 20) may be immediately thereafter charged by a pouring ladle K into the central hollow portion between the scrap piles, without the necessity of covering the open end portion of the furnace and within a maximum period of two minutes, with a resultant total charging time that will not exceed five minutes.

When the molten metal is added, then the oxygen blow roof H is swung in position over the furnace G and the melting and refining operation is initiated by flowing oxygen through one or more oxygen lances 90. The central positioned molten metal to which the oxygen blow is directly applied, quickly and efficiently causes the surrounding scrap piles to be progressively melted down with an exothermic type of reaction. At the completion of the melting operation, the oxygen hood and the lance 90 may be remved and the electrode hood I may then be swung into position, as shown in FIGURE 5. The electrodes 91 may then be energized to hold the molten metal for pouring or tapping and, if desired, to further refine the molten metal. It will be appreciated that the amount of electric energy for this purpose is minimal.

The use of an enlarged hood-like furnace roof H increases the capacity of the furnace while enabling it to have a minimal depth substantially corresponding to the total quantity of molten metal produced in the melting-down operation. This makes maximum utilization of space provided by the hood-like roof for the piling up of the solid scrap material and a lower distance of drop such material when charged on the hearth of the furnace G. Further, it enables carbon monoxide gas generated by the oxygen blow operation to be burned within the large upper area provided for the furnace by the hood roof H and its heat thus utilized before the fume or hot gases are passed to the collecting column J. The construction is such that an excessive or other than normal height of the wall of the furnace G is unnecessary. The melt can be viewed by the operator through a conventional furnace door (not shown) during the operation and between change of furnace roofs, and it will be possible to use a maximum quantity of scrap metal and in a highly efficient and economical manner, at the same time, employ an oxygen blow.

In employing the preheater silo B, it is contemplated that a lower portion of the scrap column therein, preferably the lower fully preheated one third, will be used as a full furnace charge each time a scrap bucket assembly D is to be filled. The intermediate one third will have an intermediate heated temperature and the upper one third of the scrap column will have the lowest temperature. When the lower one third is delivered to the assembly D, a new one third of cold scrap is introduced into the top end of the column, and the intermediate one third then becomes the bottom layer, section or portion of the column that, upon the application of hot gas flow then becomes the hottest portion of the desired charging temperature, and the operation is repeated. The weighing machine E (see FIGURES 12 and 13) is adapted to rotate or to be rotated when, for example, compartment $c$ of the bucket assembly D is filled to rotate the bucket assembly D and align the next compartment $b$ with the conveyor C and then, when compartment $b$ is filled, to rotate and align compartment $a$. The preheated scarp charge is preferably evenly distributed, as indicated by its weight, within the three compartments to provide a balanced lift load for the overhead crane. The belt 45 of the conveyor C may be stopped during such alignment changes. If desired, the furnace G can be slightly tilted to run off excess slag when the oxygen blowing is completed and the roof H is in position thereover by slightly lifting the roof H, using the chains of the overhead hoist or crane.

In accordance with the invention, basic oxygen steel is made by the alternate use of two roofs, and changing from one to the other at least once during the process of making heated steel. The primary or melting down operation is accomplished with a large volume hood roof in place that materially enlarges the effective chamber area of the furnace above the charge and the melt. The secondary operation such as holding and pouring of the melt is effected with a conventional, relatively low volume roof in place. The low volume roof is of a type that may be tilted with the furnace during pouring, etc. The providing of a doughnut or ring shape of scrap charge also tends to protect the refractory lining of the furnace from molten metal spatter. The preheated scrap is charged by a self-dumping bucket assembly that automatically shapes the scrap as charged on the hearth or bottom of the furnace.

Although an embodiment of the invention has been shown and described, it will be apparent to those skilled in the art that various changes and modifications may be made in the apparatus or system involved and in the procedure without departing from the spirit and scope of the invention as indicated in the appended claims.

I claim:

1. A method of preparing and handling solid metal scrap to provide a complete charge for a melting and refining furnace which comprises, providing a column of solid metal scrap within a container, preheating and conditioning the scrap by passing hot furnace exhaust gases upwardly therethrough along the column, taking-off a bottom hotter portion of the column of an amount substantially corresponding to the charge for the furnace, feeding the preheated taken-off hotter portion of the scrap into a succession of charging bucket container compartments about a central axis, proportioning the amount of scrap fed into each compartment to provide a balanced weight relation about the central axis and a sufficient quantity for the furnace charge, and then substantially simultaneously discharging the scrap from bottom ends of all the compartments and forming a dougnut-shaped scrap configuration on the hearth of the furnace.

2. An improved method of melting and refining a charge comprisinng solid scrap metal and molten metal in a furnace having an open top end and a bottom hearth wherein a quantity of scrap metal may be utilized beyond the normal capacity of the furnace which comprises, centrally-suspending a hole maker body within and charging at least a portion of the scrap metal through the open top end on the hearth and about the body to provide a doughnut shape of upwardly-extending scrap piles on the hearth, withdrawing the body to leave a hollow central area on the hearth, pouring molten metal into the hollow central area and forming an upwardly-extending pool centrally of the scrap piles, placing an oxygen blow hood roof over the open top end of the furnace, injecting oxygen towards the molten metal pool and setting up and maintaining an exothermic reaction with the molten metal, progressively fully melting down the scrap piles into the molten metal pool and refining the molten metal, thereafter removing the oxygen blow hood and placing a conventional roof over the open top end of the furnace, and then tapping molten metal from the furnace.

3. A method as defined in claim 2 wherein the scrap metal is simultaneously charged into the furnace from a group of compartments and about the hole maker body.

4. A method as defined in claim 2 wherein the scrap metal is charged into the furnace in a weight-balanced relation about the hole maker body.

5. An improved method as defined in claim 2 wherein, the scrap metal is charged on the hearth in scrap piles that extend above the open top end of the furnace and in an amount that when melted down with the poured molten metal will provide a level of molten metal within the capacity of the furnace, and the oxygen blow hood roof is provided with an upwardly-extending chamber portion that forms a vertical extension of the furnace interior of an extent to cover the above-extending scrap piles in a spaced relation with respect thereto.

6. An improved method as defined in claim 2 wherein, the oxygen blow hood is provided with an upwardly-extending chamber portion forming a vertical extension of the furnace interior that defines a chamber area above the scrap metal piles, and carbon monoxide gas generated by the injecting of the oxygen is burned into carbon dioxide gas in the chamber portion of the hood.

7. An improved method as defined in claim 2 wherein hot gases generated within the furnace are removed therefrom, tempered and moved through cold scrap metal to preheat it for charging into the furnace.

8. A method as defined in claim 2 wherein the molten metal is subjected to electric arc generated heat after the conventional roof is placed over the open top end of the furnace.

9. A method as defined in claim 2 wherein, the hot gases generated within the furnace when the oxygen blow hood roof and the conventional roof are in place over the top end of the furnace, are progressively removed from the furnace, are passed through cold scrap metal, to preheat it for charging, are cooled by the scrap metal, and are then exhausted to a stack.

10. A method as defined in claim 2 wherein, the hood roof is swung from the position one one side of the furnace to and from a position over the open top end of the furnace, and the convenional roof is swung from a position on an opposite side of the furnace to and from a position over the open top end of the furnace.

11. A method as defined in claim 7 wherein, the oxygen blow hood roof and the conventional roof are each provided with a gas outlet port, a fume collecting tower is positioned adjacent the furnace and is provided with an upper inlet port and a downstream outlet duct, the outlet port of the hood roof and of the conventional roof are moved into registry with the inlet port of the collecting tower to deliver the hot gases thereto when the respective roofs are placed over the open top end of the furnace, a vertically-extending preheating chamber is provided having at least one bottom gas inlet portion and a top outlet port, cold scrap metal is placed in the form of a vertical column within the preheating chamber, hot furnace gases are passed from the outlet duct of the tower into the bottom gas inlet port of the preheating chamber and upwardly through the cold scrap metal therein to impart preheat thereto and cool the gases, and the cooled gases are exhausted through the outlet port of the preheating chamber.

12. A mehod as defined in claim 11 wherein, a scrap bucket is provided with a group of peripherally-spaced elongated scrap receiving compartments and with the hole making body centrally-operably disposed in a central compartment, preheated scrap metal is discharged from a bottom portion of the preheating chamber to fill the receiving compartments and is weighed in the scrap bucket to provide a requisite quantity of charge for the furnace, the scrap bucket with preheated scrap within its compartments is moved into a position within the open top end of the furnace, the hole making body is then moved downwardly along the central compartment within the furnace to a slightly spaced position above the hearth and the preheated scrap metal is discharged from the bottom of the receiving compartments into the furnace, and the scrap bucket is moved out of position with respect to the furnace before the hood roof is placed in position thereon.

13. A method as defined in claim 11 wherein, cold scrap material is subjected to magnetic separation to provide the cold scrap metal that is preheated and charged into the furnace.

14. A method as defined in claim 11 wherein, the preheating chamber is tilted to discharge preheated metal scrap from the bottom portion thereof, and cold metal scrap is fed into an upper end portion of the preheating chamber when it is tilted.

15. A method as defined in claim 11 wherein, the hood roof is swung from a position on the collecting tower to and from a position over the open top end of the furnace.

16. An improved scrap bucket appartus which comprises, an outer container wall of open-end construction, a group of peripherally-spaced inner container walls of open-end construction secured within said outer container wall, each inner container wall defining a scrap metal receiving compartment having swingably-mounted door means for closing-off its lower end to retain scrap metal in its compartment and for opening its lower end to charge scrap metal from its compartment, a sleeve member secured within said outer container wall centrally of said inner container walls, a hole-maker operatively-positioned for vertical movement along said sleeve member, an upper yoke member mounted within said outer container wall above said inner container walls and said sleeve member for up and down movement with respect thereto, means operatively-connecting said yoke member to said door means and to said hole-maker, and means for raising said yoke member to close said door means and move said hole-maker to an upper retracted position within said sleeve member and for lowering said yoke member to open said door means and move said hole-maker within said sleeve member to a lower projecting position.

17. An improved scrap bucket apparatus as defined in claim 16 wherein, a bottom yoke is secured within a bottom end portion of said outer container walls and hinge means is connected between said bottom yoke and between said outer container wall and said door means for swingably-mouting said door means.

18. In the melting and refining of a metal charge of solid scrap metal and molten metal in a single furnace having an open top end that is to be closed-off and vented during the operation and that has a pair of interchangeable roofs of which one is an oxygen-blow roof of greater volume capacity than the other and the other is an electrode-equipped roof, the improved method: after introducing the metal charge into the furnace, closing-off the open top end of the furnace with the oxygen-blow roof and employing an oxygen-blow to refine the charge therein while venting hot gases therefrom through an outlet duct in such roof, removing the oxygen-blow roof and closing-off the open top end of the furnace with the electrode-equipped roof, thereafter applying electrode-generated heat to the charge in the furnace and venting hot gases therefrom through an outlet duct in the electrode-equipped roof, directly passing the hot gases vented from the outlet ducts of each of the roofs through a closed duct into a side-positioned collecting tower, passing the hot gases from the collecting tower through a duct system into a scrap preheater, progressively passing the hot gases through solid metal scrap in the preheater, and then removing hotter portions of the scrap from the preheater and charging them into the furnace.

19. A method as defined in claim 18 wherein, the solid metal scrap is preheated and first charged into the furnace to provide a doughnut-shaped configuration having a central open portion within the furnace, molten metal is then introduced into the central open portion to provide a molten metal pool and complete the charging of the furnace, and oxygen is injected towards the molten metal pool and an exothermic reaction is set up and maintained with the molten metal of the pool to effect a complete melting down of the charge within the furnace while the oxygen-blow roof is closing-off the open top end of the furnace.

20. An improved scrap bucket apparatus which comprises, an outer container wall of open end construction, a group of peripherally-spaced inner container walls of open-end construction secured within said outer container wall, each inner container wall defining a scrap receiving compartment having swingably-mounted door means for closing-off its lower end to retain scrap metal in its compartments and for opening its lower end to charge scrap metal from its compartment, a yoke means mounted within said outer container wall and above said inner container walls for up and down movement with respect thereto, means operatively-connecting said yoke means to said door means, and means for raising said yoke means to close said door means and for lowering said yoke means to simultaneously open the said door means of each said scrap receiving compartment.

References Cited

UNITED STATES PATENTS

| | | | |
|---|---|---|---|
| 3,163,520 | 12/1964 | Collin et al. | 13—33 X |
| 3,336,020 | 8/1967 | Palzak | 266—5 |
| 3,379,815 | 3/1968 | Parker | 13—2 |

BERNARD A. GILHEANY, *Primary Examiner.*

H. B. GILSON, *Assistant Examiner.*

U.S. Cl. X.R.

13—33

UNITED STATES PATENT OFFICE
CERTIFICATE OF CORRECTION

Patent No. 3,444,304      Dated May 13, 1969

Inventor(s) Levi S. Longenecker

It is certified that error appears in the above-identified patent and that said Letters Patent are hereby corrected as shown below:

Column 9, line 17, "remved" should read --removed--.
Column 11, line 24, "one", first occurrence, should read --on--.
Column 12, line 30, "walls" should read --wall--.

SIGNED AND
SEALED
FEB 3 1970

(SEAL)
Attest:

Edward M. Fletcher, Jr.
Attesting Officer

WILLIAM E. SCHUYLER, JR.
Commissioner of Patents